United States Patent [19]

Katagiri et al.

[11] Patent Number: 5,086,363
[45] Date of Patent: Feb. 4, 1992

[54] MAGNETIC TAPE CASSETTE CASING

[75] Inventors: Shingo Katagiri; Shigeru Nishiyama, both of Kanagawa, Japan

[73] Assignee: Fuji Photo Film Co., Ltd., Kanagawa, Japan

[21] Appl. No.: 592,390

[22] Filed: Oct. 3, 1990

[30] Foreign Application Priority Data

Oct. 4, 1989 [JP] Japan .................. 1-116964[U]

[51] Int. Cl.⁵ ........................................ G11B 23/023
[52] U.S. Cl. ................................. 360/132; 242/199
[58] Field of Search ............... 360/132, 134; 242/199, 242/200

[56] References Cited

U.S. PATENT DOCUMENTS 3,991,956 11/1976 Machida ............................ 242/199
4,131,243 12/1978 Machida ............................ 242/199
4,476,510 10/1984 Hoover ............................. 360/132

Primary Examiner—John H. Wolff
Attorney, Agent, or Firm—Sughrue, Mion, Zinn, Macpeak & Seas

[57] ABSTRACT

A magnetic tape cassette casing is formed of upper and lower cassette halves each of which has a rear wall portion extending in the direction of thickness of the casing. The cassette halves are mated together with the top surfaces of the rear wall portions thereof abutting against each other. The cassette casing is provided with a hole defined by recesses formed in the top surfaces of the rear wall portions of the cassette halves substantially at the center between the left and right side ends. The hole is 0.04 to 1.0 mm in width and 2 to 20 mm in length.

3 Claims, 2 Drawing Sheets

MAGNETIC TAPE CASSETTE CASING

BACKGROUND OF THE INVENTION

1. Field of the Invention

This invention relates to a magnetic tape cassette casing, and more particularly to a structure of cassette halves which form the casing of a magnetic tape cassette.

2. Description of the Prior Art

Generally, a magnetic tape cassette has a casing formed of upper and lower cassette halves. Since the cassette halves are generally formed by plastic injection molding, they are apt to warp in the longitudinal direction and when they are mated together to form the cassette casing, they are in contact with each other at the center and are away from each other at opposite ends as shown in FIG. 5 in which upper and lower halves are respectively denoted by reference numerals 2 and 3 and the center of the cassette casing is denoted by reference numeral 4. Accordingly, when the halves 2 and 3 are bolted together, they can be pressed against each other under excessively high pressure, and as a result the cassette casing can be deformed. When the cassette casing is deformed, a pair of head pins 6 (FIG. 6) which are for guiding a magnetic tape 5 on opposite sides of a magnetic head and should be vertical in parallel to each other can be inclined as shown in FIG. 7. This adversely affects recording and reproducing properties.

SUMMARY OF THE INVENTION

In view of the foregoing observations and description, the primary object of the present invention is to provide a magnetic tape cassette casing which cannot be deformed due to warpage of the cassette halves.

The magnetic tape cassette casing in accordance with the present invention is characterized by having a hole in the rear wall portion which is defined by a recess formed in the top surface of the rear wall portion of each or one of the cassette halves at the center between the left and right side ends, the hole being 0.04 to 1.0mm in width and 2 to 20mm in length.

That is, each cassette half has a peripheral wall (comprising left and right side wall portion and the rear wall portion) which extends in the direction of thickness of the cassette casing and the cassette halves are mated together with the top surfaces of the respective peripheral walls abutting against each other. In accordance with the present invention, a recess is formed in the top surface (the mating surface) of the rear wall portion of each or one of the cassette halves at the center between the left and right side ends at which the halves are most strongly pressed against each other. With this arrangement, stress does not acts on the center of the rear wall portions when the halves are bolted together and deformation of the cassette casing can be prevented.

In view of dispersion of stress and prevention of dust from entering the cassette, the size of the hole is limited to the value described above.

DESCRIPTION OF THE PREFERRED EMBODIMENTS

Figure 1:
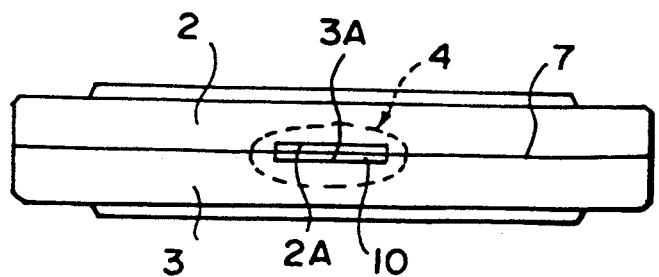
FIG. 1 is a rear view of a magnetic tape cassette casing in accordance with an embodiment of the present invention.
Figure 2:
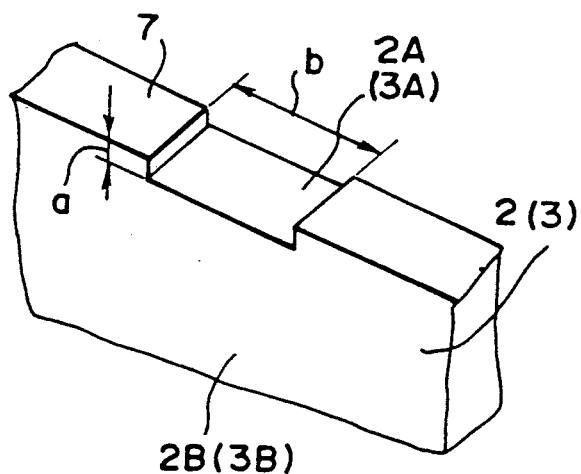
FIG. 2 is an enlarged fragmentary view of one of the cassette halves of the cassette casing.

In FIG. 1, a cassette casing in accordance with an embodiment of the present invention is formed of upper and lower cassette halves 2 and 3. As shown in FIG. 2, the upper and lower cassette halves 2 and 3 respectively have rear wall portions 2B and 3B each having a flat top surface 7, and are mated together with the top surfaces 7 of the rear wall portions 2B and 3B abutting against each other. The upper and lower cassette halves 2 and 3 are provided with recesses 2A and 3A in the respective top surfaces 7 of the rear wall portions 2B and 3B at the center between the left and right ends. Accordingly, the cassette casing of this embodiment has a hole 10 defined by the recesses 2A and 3A. In this particular embodiment, the recess 2A and 3A are the same in size, and are 0.02 to 0.5mm in depth (indicated at a in FIG. 2) and 2 to 20mm in length (indicated at b in FIG. 2). Accordingly, the hole 10 is 0.04mm to 1.0mm in width and 2mm to 20mm in length. This size of the hole 10 is for a standard size magnetic tape cassette casing. When the width of the hole 10 is smaller than 0.04mm, stress which acts on the center of the rear wall portions 7 when the halves 2 and 3 are bolted together cannot be sufficiently dispersed, and when the width of the hole 10 is larger than 1.0mm, dust is apt to enter the cassette casing. Similarly, when the length of the hole 10 is smaller than 2mm, the stress which acts on the center of the rear wall portions 7 when the halves 2 and 3 are bolted together cannot be sufficiently dispersed, and when the length of the hole 10 is larger than 20mm, dust is apt to enter the cassette casing.

Figure 3:
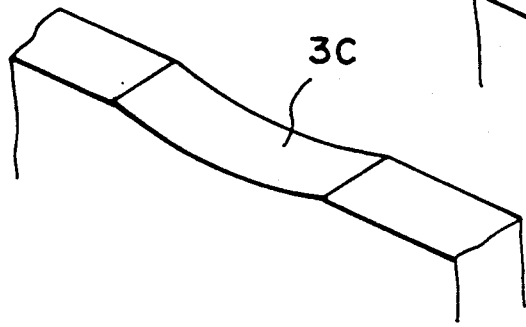
FIG. 3 is a view similar to FIG. 2 but showing another embodiment of the present invention.
Figure 4:
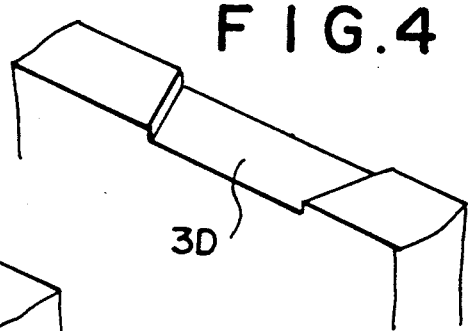
FIG. 4 is a view similar to FIG. 2 but showing still another embodiment of the present invention.
Figure 5:
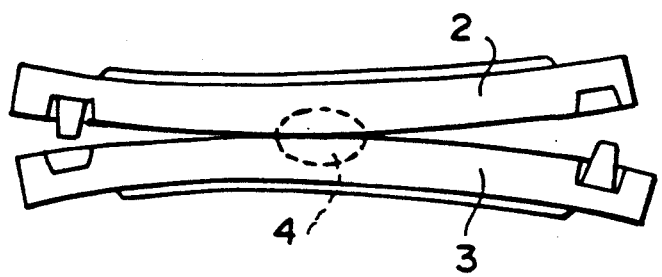
FIG. 5 is a rear view showing upper and lower cassette halves of a conventional magnetic tape cassette.
Figure 6:
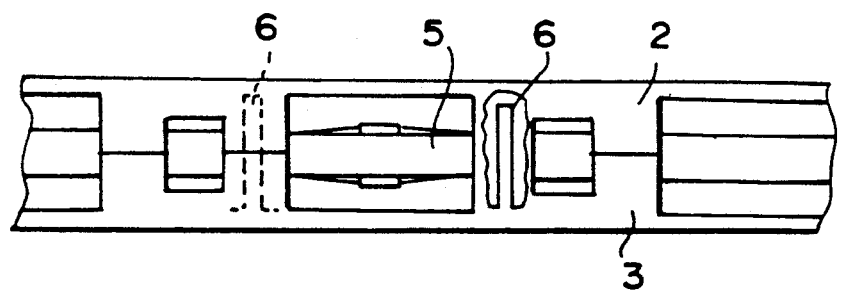
FIG. 6 is a fragmentary front view of a magnetic tape cassette without deformation.
Figure 7:
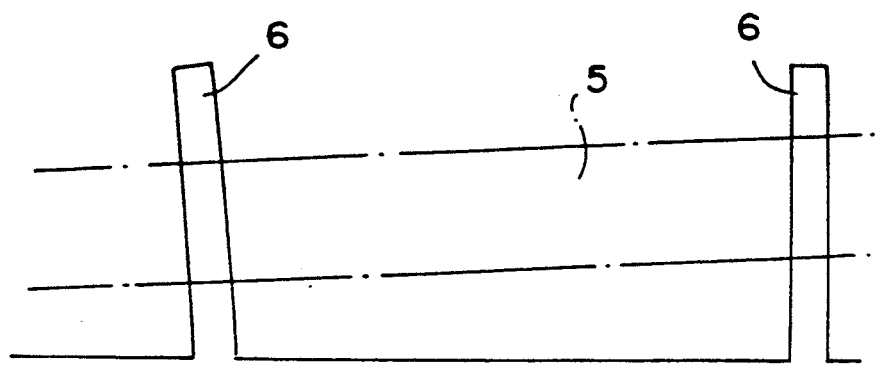
FIG. 7 is a schematic view for illustrating inclination of head pins in a deformed magnetic tape cassette.

The depth of the recess may be gradually increased toward the center thereof like a recess 3C shown in FIG. 3. Further, the recess may be tapered toward the outer surface of the rear wall portion to prevent entrance of dust like a recess 3D shown in FIG. 4.

Further, though, in the embodiment shown in FIG. 1 and 2, the hole 10 is defined by a pair of recesses 2A and 3A which are respectively formed in the rear wall portions of the upper and lower cassette halves 2 and 3 and the same in size, the recesses need not be the same in size. If desired, the hole 10 may be defined by a single recess formed in the rear wall portion of one of the cassette halves so long as the size of the hole is in the range described above.

We claim:

1. A magnetic tape cassette casing formed of upper and lower cassette halves each of which has a rear wall portion extending in the direction of thickness of the casing and which are mated together with the top surfaces of the rear wall portions thereof abutting against each other, characterized by having a hole defined by a recess formed in the top surface of the rear wall portion of each or one of the cassette halves substantially at the center between the left and right side ends, the hole being 0.04 to 1.0mm in width and 2 to 20mm in length.

2. A magnetic tape cassette casing as defined in claim 1 in which the width of said hole gradually increases toward the center thereof.

3. A magnetic tape cassette casing as defined in claim 1 in which the length of said hole gradually decreases toward the outer surface of the casing.

* * * * *